(12) United States Patent
Hung et al.

(10) Patent No.: US 11,002,829 B2
(45) Date of Patent: May 11, 2021

(54) RADAR INTERFERENCE MITIGATION METHOD AND APPARATUS

(71) Applicant: MediaTek Inc., Hsinchu (TW)

(72) Inventors: Chih-Ming Hung, McKinney, TX (US); Khurram Muhammad, Winston-Salem, NC (US)

(73) Assignee: MediaTek Inc.

( * ) Notice: Subject to any disclaimer, the term of this patent is extended or adjusted under 35 U.S.C. 154(b) by 396 days.

(21) Appl. No.: 15/486,887

(22) Filed: Apr. 13, 2017

(65) Prior Publication Data

US 2017/0219689 A1 Aug. 3, 2017

Related U.S. Application Data

(60) Provisional application No. 62/322,868, filed on Apr. 15, 2016.

(51) Int. Cl.
*G01S 7/02* (2006.01)
*G01S 13/34* (2006.01)
(Continued)

(52) U.S. Cl.
CPC ............... *G01S 7/023* (2013.01); *G01S 7/35* (2013.01); *G01S 13/343* (2013.01);
(Continued)

(58) Field of Classification Search
CPC .... G01S 13/931; G01S 13/345; G01S 13/584; G01S 13/34; G01S 7/023; G01S 13/343;
(Continued)

(56) References Cited

U.S. PATENT DOCUMENTS 4,601,047 A * 7/1986 Horwitz ............... H04J 13/00
370/479
4,996,534 A * 2/1991 Grubbs ................. G01S 7/412
342/195
(Continued)

FOREIGN PATENT DOCUMENTS

CN 103278807 A 9/2013
EP 0157692 A2 * 10/1985 ........... H04B 1/7085
(Continued)

OTHER PUBLICATIONS

Giannini, V. et al., "A 79GHz Phase-Modulated 4GHz-BW CW Radar TX in 28nm CMOS", ISSCC 2014, Session 14, Millimeter-Wave and Terahertz Techniques 14.2, 2014 IEEE International Solid-State Circuits Conference, Feb. 11, 2014.
(Continued)

*Primary Examiner* — Olumide Ajibade Akonai
(74) *Attorney, Agent, or Firm* — Han IP PLLC; Andy M. Han

(57) ABSTRACT

Methods and apparatuses pertaining to radar interference mitigation are described. A processor associated with an apparatus may generate a plurality of wave frames such that one or more aspects of the plurality of wave frames vary from one wave frame to another wave frame of the plurality of wave frames. Each of the plurality of wave frames may respectively include a plurality of chirps. A wireless transmitter associated with the apparatus may transmit the plurality of wave frames. A wireless receiver associated with the apparatus may receive one or more reflected waves comprising at least a portion of one or more of the wave frames reflected by an object. The processor may determine a distance between the object and the apparatus, a speed of the objet, or both, based on an analysis of the one or more reflected waves.

4 Claims, 6 Drawing Sheets

(51) Int. Cl.
  *G01S 7/35*  (2006.01)
  *G01S 13/58*  (2006.01)
  *G01S 13/931*  (2020.01)
  *H04J 13/00*  (2011.01)
  *H04J 13/10*  (2011.01)

(52) U.S. Cl.
  CPC .......... *G01S 13/345* (2013.01); *G01S 13/584* (2013.01); *G01S 13/931* (2013.01); *H04J 13/0022* (2013.01); *H04J 13/10* (2013.01)

(58) Field of Classification Search
  CPC ........ G01S 7/354; G01S 7/4021; G01S 13/02; G01S 7/28; G01S 11/10; G01S 5/08; H04J 13/0022; H04J 13/10; H04J 3/0638
  See application file for complete search history.

(56) References Cited

U.S. PATENT DOCUMENTS

| | | | | |
|---|---|---|---|---|
| 6,469,662 | B2* | 10/2002 | Tullsson | G01S 7/023 342/128 |
| 6,606,052 | B1* | 8/2003 | Miyahara | G01S 13/343 342/107 |
| 7,791,530 | B2* | 9/2010 | Puglia | G01S 7/352 342/128 |
| 9,829,566 | B2* | 11/2017 | Rao | G01S 7/023 |
| 2006/0109169 | A1* | 5/2006 | Winter | G01S 13/345 342/70 |
| 2007/0229347 | A1* | 10/2007 | Holmberg | G01S 13/106 342/26 R |
| 2008/0204307 | A1* | 8/2008 | Fukuda | G01S 7/032 342/175 |
| 2011/0122014 | A1* | 5/2011 | Szajnowski | G01S 13/26 342/109 |
| 2011/0227784 | A1* | 9/2011 | Beasley | G01S 7/354 342/195 |
| 2012/0235857 | A1* | 9/2012 | Kim | G01S 13/345 342/134 |
| 2014/0313071 | A1* | 10/2014 | McCorkle | G01S 7/28 342/202 |
| 2015/0192665 | A1 | 7/2015 | Lim et al. | |
| 2015/0301157 | A1 | 10/2015 | Alicja et al. | |
| 2015/0301172 | A1 | 10/2015 | Alicja et al. | |
| 2016/0054432 | A1* | 2/2016 | Lilburn | G01S 13/28 342/195 |
| 2016/0356885 | A1* | 12/2016 | Hakobyan | G01S 13/931 |

FOREIGN PATENT DOCUMENTS

| | | |
|---|---|---|
| EP | 2006709 A1 | 12/2008 |
| EP | 2009572 A1 | 12/2008 |
| WO | WO 9833073 A1 | 7/1998 |

OTHER PUBLICATIONS

European Patent Office, Search Report for European Patent Application No. 17781948.9, dated May 9, 2018.
Taiwan Intellectual Property Office, Office Action for Taiwan Patent Application No. 106112519, Aug. 29, 2018.

* cited by examiner

500

GENERATE, BY A PROCESSOR ASSOCIATED WITH AN APPARATUS, A PLURALITY OF WAVE FRAMES TRANSMITTED BY A WIRELESS TRANSMITTER ASSOCIATED WITH THE APPARATUS, SUCH THAT:

- EACH OF THE PLURALITY OF WAVE FRAMES RESPECTIVELY COMPRISES A PLURALITY OF CHIRPS;
- AT LEAST A FIRST WAVE FRAME OF THE PLURALITY OF WAVE FRAMES IS DIFFERENT FROM AT LEAST A SECOND WAVE FRAMES OF THE PLURALITY OF WAVE FRAMES; AND
- AT LEAST A FIRST CHIRP OF THE PLURALITY OF CHIRPS OF THE FIRST WAVE FRAME IS DIFFERENT FROM AT LEAST A SECOND CHIRP OF THE PLURALITY OF CHIRPS OF THE FIRST WAVE FRAME

— 510

RECEIVE, BY THE PROCESSOR, ONE OR MORE REFLECTED WAVES COMPRISING AT LEAST A PORTION OF ONE OR MORE OF THE WAVE FRAMES REFLECTED BY AN OBJECT

— 520

DETERMINE, BY THE PROCESSOR, A DISTANCE BETWEEN THE OBJECT AND THE APPARATUS, A SPEED OF THE OBJET, OR BOTH, BASED ON AN ANALYSIS OF THE ONE OR MORE REFLECTED WAVES

TRANSMIT, BY A WIRELESS TRANSMITTER ASSOCIATED WITH AN APPARATUS, A PLURALITY OF WAVE FRAMES, EACH OF THE PLURALITY OF WAVE FRAMES RESPECTIVELY COMPRISING A PLURALITY OF CHIRPS, SUCH THAT ONE OR MORE ASPECTS OF THE PLURALITY OF WAVE FRAMES VARY FROM ONE WAVE FRAME TO ANOTHER WAVE FRAME OF THE PLURALITY OF WAVE FRAMES ⎯ 610

RECEIVE, BY A WIRELESS RECEIVER ASSOCIATED WITH THE APPARATUS, ONE OR MORE REFLECTED WAVES COMPRISING AT LEAST A PORTION OF ONE OR MORE OF THE WAVE FRAMES REFLECTED BY AN OBJECT ⎯ 620

FIG. 6

RADAR INTERFERENCE MITIGATION METHOD AND APPARATUS

CROSS REFERENCE TO RELATED PATENT APPLICATION(S)

The present disclosure is part of a non-provisional application claiming the priority benefit of U.S. Patent Application No. 62/322,868, filed on 15 Apr. 2016, which is incorporated by reference in its entirety.

TECHNICAL FIELD

The present disclosure is generally related to remote sensing and, more particularly, to interference mitigation for radar systems.

BACKGROUND

Unless otherwise indicated herein, approaches described in this section are not prior art to the claims listed below and are not admitted to be prior art by inclusion in this section.

Advanced driver assistance systems (ADAS) are systems developed to automate, adapt and enhance vehicle systems for safety and better driving experience. A typical ADAS has a number of built-in safety features that help avoid collisions and accidents by alerting the driver to potential hazards or by taking over control of the vehicle at least partially and momentarily. Some vehicles equipped with ADAS may have radar systems that constantly sense real-time distance(s), relative velocity and angles between vehicles, thereby improving driving efficiency and safety. Radar systems are also deployed in autonomous driving vehicles.

Currently a majority of commercially available automotive radars use frequency-modulated continuous-wave (FMCW) modulation. There is, however, no regulation nor standard on mitigation of radar interference by radar systems of adjacent vehicles. As more and more vehicles introduced to the market will be equipped with ADAS having radar sensors, it is expected that interference will become more and more severe. For interference mitigation, currently, there is no solution for commercially available radars using FMCW waveforms. Moreover, various modulation schemes such as phase-modulated continuous-wave (PMCW) modulation typically require additional complexity, power consumption and cost in hardware.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions and/or schemes for radar interference mitigation while addressing aforementioned issues. Advantageously, embodiments in accordance with the present disclosure may allow the use or re-use of existing algorithms for FMCW, which have had decades of research and development. Moreover, embodiments in accordance with the present disclosure may allow the re-use of cost-effective FMCW architecture. Furthermore, embodiments in accordance with the present disclosure may alleviate interference concern and/or may increase the effective signal-to-noise ratio (SNR) when combining multiple chirps of measurements. It is noteworthy that, although description provided herein primarily pertains to radar interference mitigation in the context of radar systems of road vehicles/automobiles, the inventive concepts described herein can be implemented in other applications that may benefit therefrom. For instance, radar systems used for or otherwise equipped on other platforms (e.g., waterborne vessels, airborne vessels, land-based mobile objects and land-based stationary objects).

In one aspect, a method may involve a wireless transmitter associated with an apparatus transmitting a plurality of wave frames. Each of the plurality of wave frames may respectively include a plurality of chirps, with one or more aspects of the plurality of wave frames varying from one wave frame to another wave frame of the plurality of wave frames. The method may also involve a wireless receiver associated with the apparatus receiving one or more reflected waves comprising at least a portion of one or more of the wave frames reflected by an object.

In another aspect, a method may involve a processor associated with an apparatus generating a plurality of wave frames transmitted by a wireless transmitter associated with the apparatus. The method may also involve the processor receiving, from a wireless receiver associated with the apparatus, one or more reflected waves comprising at least a portion of one or more of the wave frames reflected by an object. The method may further involve the processor determining a distance between the object and the apparatus, a speed of the objet, or both, based on an analysis of the one or more reflected waves. Each of the plurality of wave frames respectively may include a plurality of chirps. At least a first wave frame of the plurality of wave frames may be different from at least a second wave frames of the plurality of wave frames. At least a first chirp of the plurality of chirps of the first wave frame may be different from at least a second chirp of the plurality of chirps of the first wave frame.

In another aspect, an apparatus may include a processor that includes a control circuit, a modulation circuit and a detection circuit. The control circuit may be capable of controlling operations of a wireless transmitter and a wireless receiver. The modulation circuit may be capable of generating a plurality of wave frames for transmission by the wireless transmitter. The detection circuit may be capable of receiving, from the wireless receiver, one or more reflected waves comprising at least a portion of one or more of the wave frames reflected by an object. The detection circuit may be also capable of determining a distance between the object and the apparatus, a speed of the objet, or both, based on an analysis of the one or more reflected waves. Each of the plurality of wave frames may respectively include a plurality of chirps. At least a first wave frame of the plurality of wave frames may be different from at least a second wave frames of the plurality of wave frames. At least a first chirp of the plurality of chirps of the first wave frame may be different from at least a second chirp of the plurality of chirps of the first wave frame.

In another aspect, an apparatus may include a radar sensor, which may include a wireless transmitter and wireless receiver. The wireless transmitter may transmit a plurality of wave frames. Each of the plurality of wave frames may respectively include a plurality of chirps, with one or more aspects of the plurality of wave frames varying from one wave frame to another wave frame of the plurality of wave frames. The wireless receiver may receive one or more reflected waves, which may include at least a portion of one or more of the wave frames reflected by an object.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 5 is a flowchart of an example process in accordance with an implementation of the present disclosure.

FIG. 6 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
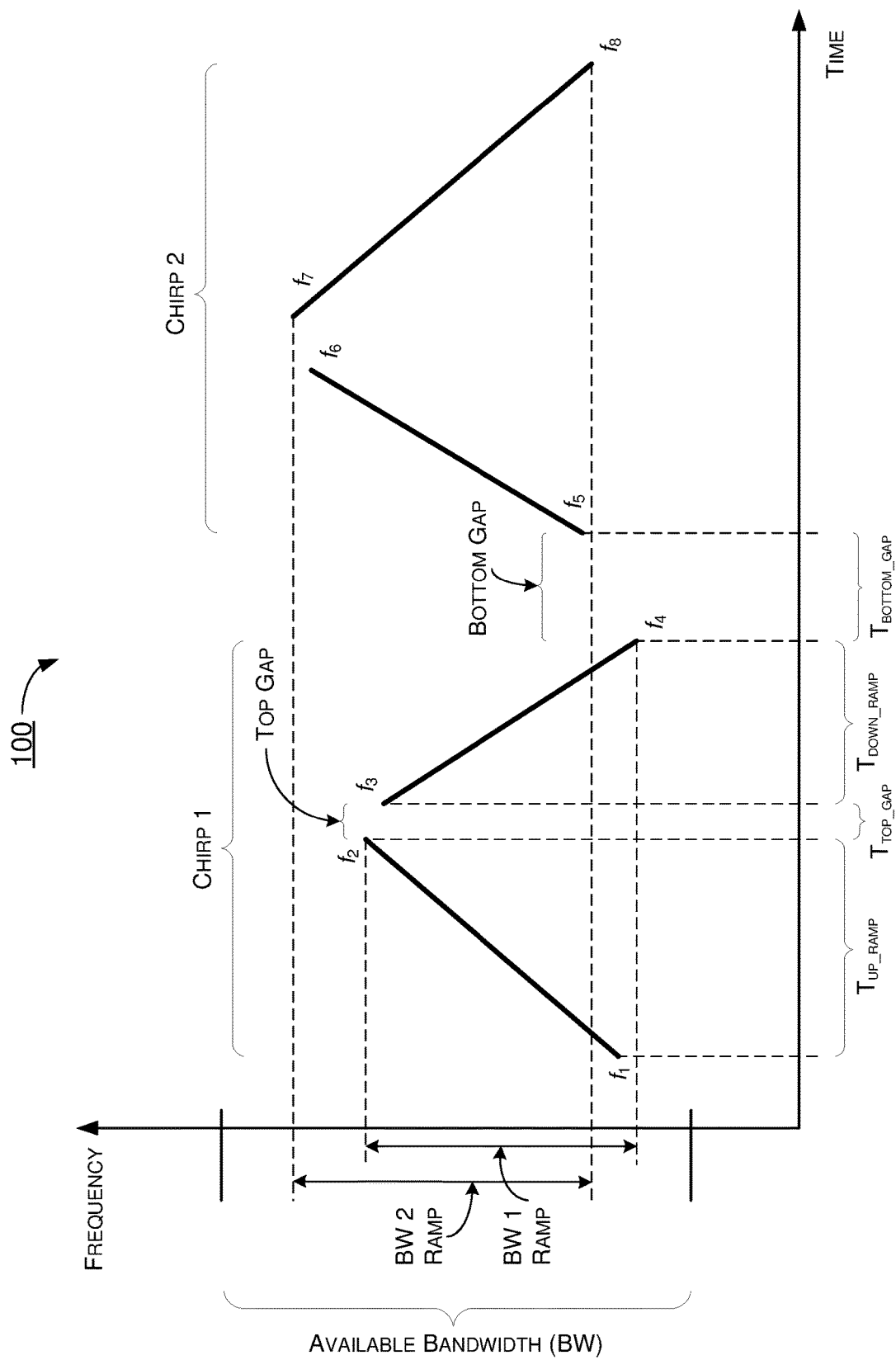
FIG. 1 is a diagram depicting an example scheme in accordance with an implementation of the present disclosure.
Figure 2:
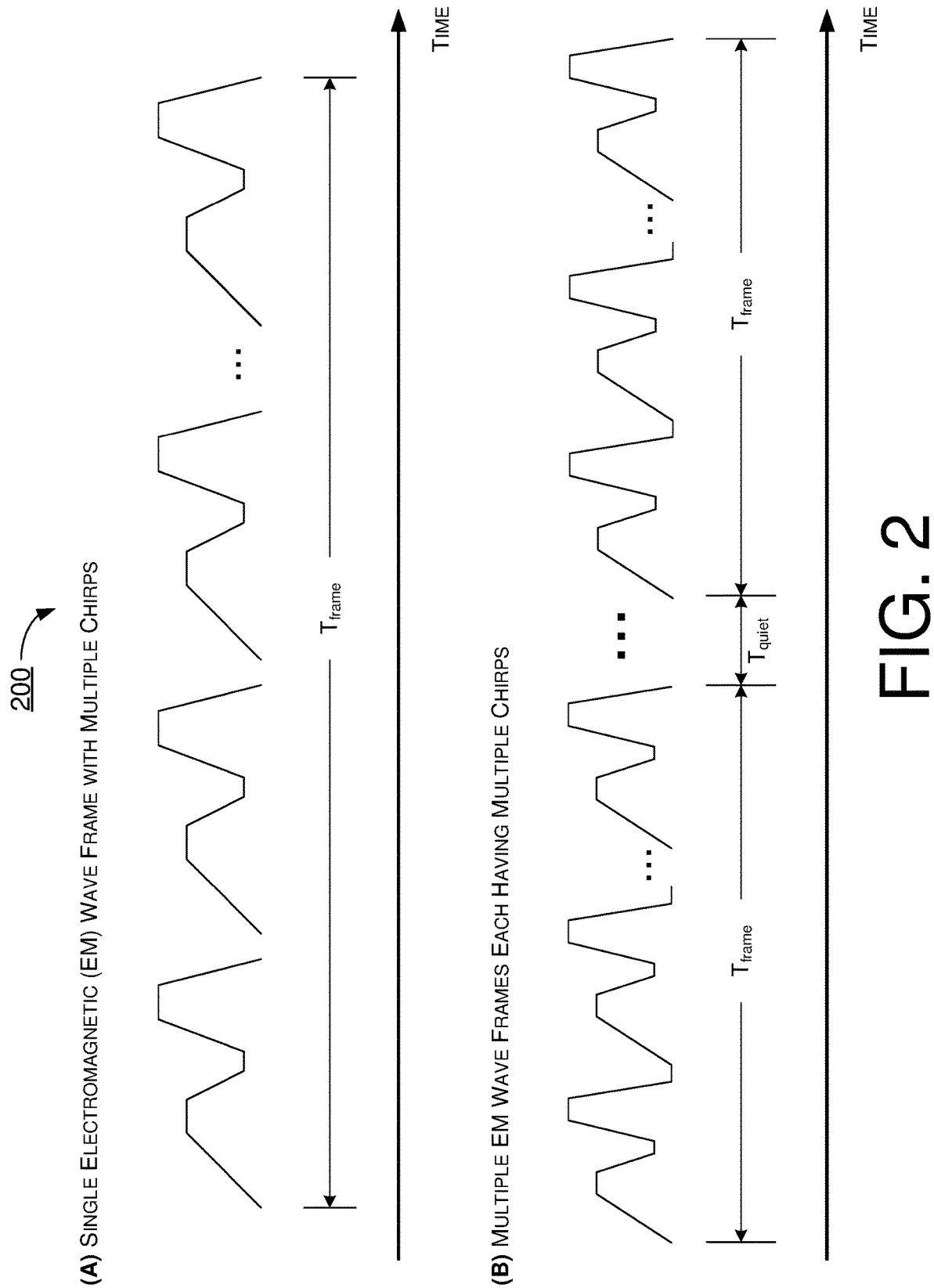
FIG. 2 is a diagram depicting an example scheme in accordance with an implementation of the present disclosure.

FIG. 1 illustrates an example scheme 100 in accordance with an implementation of the present disclosure. FIG. 2 illustrates an example scheme 200 in accordance with an implementation of the present disclosure. Schemes 100 and 200 provide non-limiting illustrations of various ways in which electromagnetic (EM) waves of a radio frequency (RF) signal transmitted and used by radar systems in accordance with the present disclosure may be constructed. Accordingly, the following description refers to FIG. 1 and FIG. 2.

In accordance with the present disclosure, a radar system may generate and transmit a series or sequence of wave frames each of which including multiple chirps. The waveform of the multiple chirps within each wave frame may vary from chirp to chirp. Correspondingly, the wave frames may vary from one wave frame to another.

As shown in FIG. 1, two chirps, namely chirp 1 and chirp 2, of a given wave frame (or burst) may differ from one another. Each chirp may include an up ramp followed by a down ramp, with a separation or gap (labeled as "top gap" in FIG. 1) between an endpoint of the up ramp and a starting point of the down ramp. Moreover, each chirp may be separated by a gap (labeled as "bottom gap" in FIG. 1). Each chirp may occupy a respective bandwidth (BW) within an available bandwidth as permitted by relevant regulation(s), law(s), standard(s) and/or protocol(s). In the example shown in FIG. 1, the range of the up ramp and down ramp of chirp 1 is labeled as "BW 1 ramp" and the range of the up ramp and down ramp of chirp 2 is labeled as "BW 2 ramp".

As shown in FIG. 1, each chirp may be characterized or otherwise represented by its corresponding four frequencies. For instance, in the case of chirp 1, it may be characterized or represented by the four frequencies of frequency 1, frequency 2, frequency 3 and frequency 4. The frequencies of frequency 1, frequency 2, frequency 3 and frequency 4 correspond to the starting point of the up ramp, endpoint of the up ramp, starting point of the down ramp and endpoint of the down ramp, respectively, of chirp 1. Similarly, in the case of chirp 2, it may be characterized or represented by the four frequencies of frequency 5, frequency 6, frequency 7 and frequency 8. Likewise, frequencies of frequency 5, frequency 6, frequency 7 and frequency 8 correspond to the starting point of the up ramp, endpoint of the up ramp, starting point of the down ramp and endpoint of the down ramp, respectively, of chirp 2. In other words, the full waveform of chirp 1 may be denoted as frequency 1→frequency 5, the full waveform of chirp 2 may be denoted as frequency 5→frequency 9 (not shown), and so on.

The duration from the starting point of the up ramp to the endpoint of the up ramp is labeled as $T_{up\_ramp}$ in FIG. 1. The duration from the starting point of the down ramp to the endpoint of the down ramp is labeled as $T_{down\_ramp}$ in FIG. 1. The duration of the gap between the endpoint of the up ramp and the starting point of the down ramp is labeled as $T_{top\_gap}$ in FIG. 1. The duration of the gap between two adjacent chirps (e.g., between the endpoint of the down ramp of chirp 1 and the starting point of the up ramp of chirp 2) is labeled as $T_{bottom\_ramp}$ in FIG. 1.

Also as shown in FIG. 1, the starting frequency and ending frequency of the up ramp and the down ramp of each chirp may be different from those of another chirp of the same wave frame. For example, the up ramp of chirp 1 may start at frequency 1 (labeled as $f_1$ in FIG. 1) and may end at frequency 2 (labeled as $f_2$ in FIG. 1), and the down ramp of chirp 1 may start at frequency 3 (labeled as $f_3$ in FIG. 1) and may end at frequency 4 (labeled as $f_4$ in FIG. 1). Similarly, the up ramp of chirp 2 may start at frequency 5 (labeled as $f_5$ in FIG. 1) and may end at frequency 6 (labeled as $f_6$ in FIG. 1), and the down ramp of chirp 2 may start at frequency 7 (labeled as $f_7$ in FIG. 1) and may end at frequency 8 (labeled as $f_8$ in FIG. 1). Each of frequency 1, frequency 2, frequency 3, frequency 4, frequency 5, frequency 6, frequency 7 and frequency 8 may be different from one another. In particular, for chirp 1 frequency 1 and frequency 4 may be the same or different, and frequency 2 and frequency 3 may be the same or different. Similarly, for chirp 2 frequency 5 and frequency 8 may be the same or different, and frequency 6 and frequency 7 may be the same or different. This applies to all chirps of each wave frame. Consequently, each chirp may be identical to or different from one or more other chirps within the same wave frame and/or one or more other chirps in one or more other wave frames. Accordingly, the bandwidth of the up ramp and down ramp as well as the values of $T_{up\_ramp}$, $T_{down\_ramp}$, $T_{top\_gap}$ and $T_{bottom\_ramp}$ may be dynamically changed or varied from chirp to chirp, and from wave frame to wave frame.

As shown in FIG. 2, each wave frame may include multiple chirps and the duration of a single wave frame is labeled as $T_{frame}$ in FIG. 2. Adjacent wave frames may be separated by a gap with a duration labeled as $T_{quiet}$ in FIG. 2.

In accordance with the present disclosure, one or more aspects of the wave frames may be dynamically changed or otherwise varied, and the dynamic variation may be automated within radar sensor(s) and/or controlled by a processor. The one or more aspects may include, for example and without limitation, a FMCW ramp rate, a frequency range, an initial phase of a RF carrier, a duration of a gap between two adjacent chirps, a slope of an up ramp of a chirp, a slope of a down ramp of the chirp, or any combination thereof, of the respective chirps of each wave frame. For instance, a pseudo random sequence such as one generated by a linear-feedback shift register (LFSR) may be utilized in dynamically varying the one or more aspects of the wave frames. Moreover, a seed number may be utilized for the pseudo random sequence. For instance, the seed number may include a value of a real-time clock (RTC) at a time when a radar sensor is enabled (e.g., when a transmitter is enabled to transmit waves or when a receiver is enabled to receive reflected waves).

In some implementations, the frequency range may be smaller than what is available according to relevant regulation(s), law(s), standard(s) and/or protocol(s). Moreover, the frequency range may vary from chirp to chirp and from wave frame to wave frame.

In some implementations, an initial phase of the RF carrier may be varied between 0 and 90 degrees. Additionally, the timing of initializing the up ramp and down ramp (e.g., the time gap between two adjacent chirps, or $T_{bottom\_gap}$), may be changed. The up ramp and down ramp of a given chirp may be different and varied, and data may be realigned internally.

In some implementations, changes of chirp waveform may be open loop, closed loop (e.g., monitored and controlled by a processor) or mixed.

In some implementations, interference patterns may be used to adjust waveform accordingly. Detection results may be correlated and/or combined with the above-described methods to enhance the discrimination, or discernment, of objects and effective SNR from multiple measurements. This may be similar to a process known as processing gain.

In some implementations, an interfered chirp may be replaced by interpolation from adjacent chirps. Similarly, an interfered wave frame may be replaced by interpolation from adjacent wave frames with detected objects/targets.

In some implementations, the slope of a ramp, whether up ramp or down ramp and denoted by its change in frequency from $f_k$ to $f_{k+1}$, may change according to a predetermined sequence. Moreover, $T_{top\_gap}$ and $T_{bottom\_gap}$ may change according to a predetermined sequence. The sequence may be generated using a pseudo-random noise (PN) source.

In some implementations, samples for range Doppler processing may be stored during the time of either up ramp or down ramp. Alternatively or additionally, samples for further processing may be stored during a part of the reception in $T_{frame}$.

In some implementations, the full waveform of each chirp, as denoted by $f_k \rightarrow f_k+4$, may be selected from a predetermined code book according to a predetermined sequence or PN source. In some implementations, chirp waveforms between wave frames may be selected from a predetermined code book according to a predetermined sequence or PN source.

Illustrative Implementations

Figure 3:
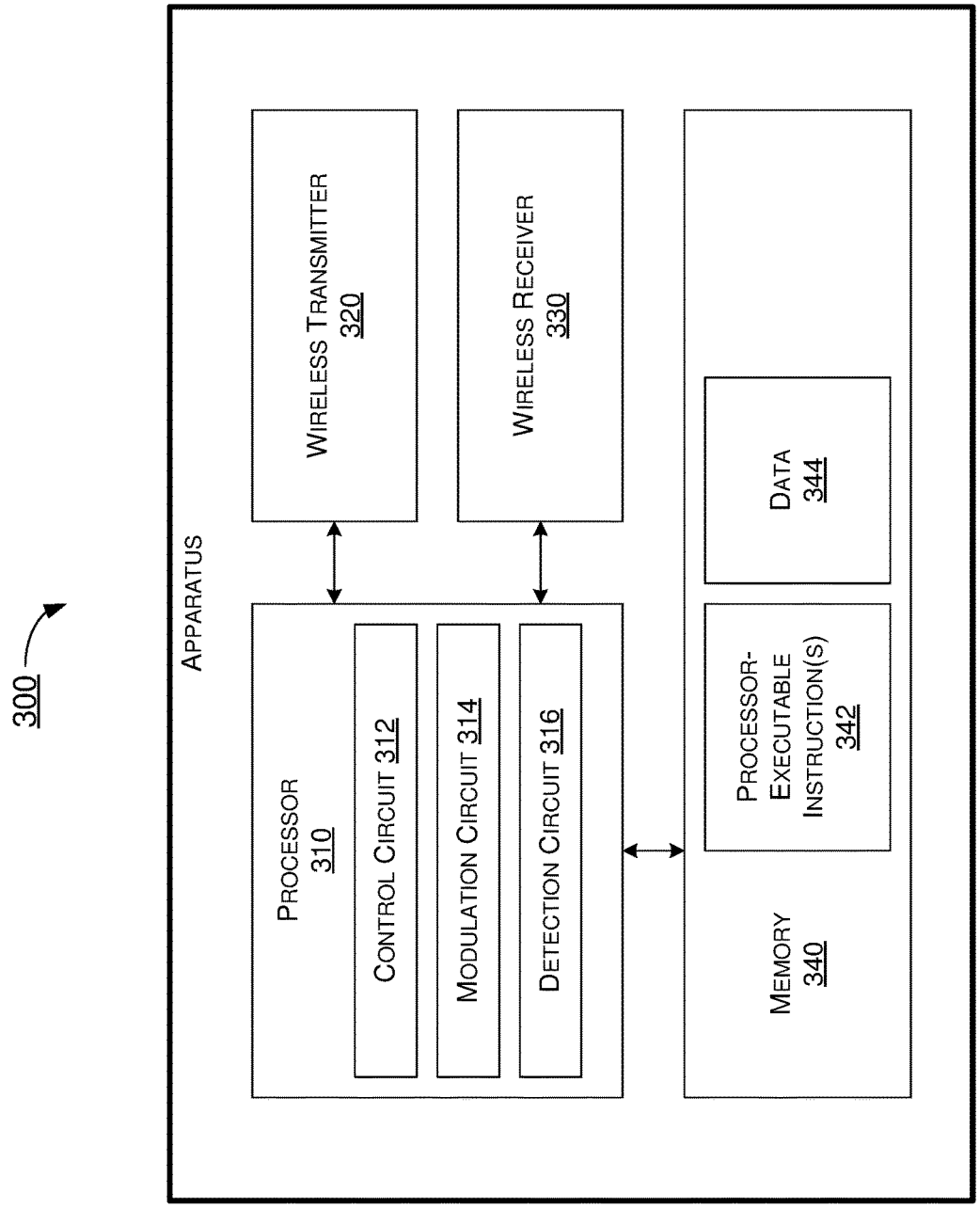
FIG. 3 is a block diagram of an example apparatus in accordance with an implementation of the present disclosure.

FIG. 3 illustrates an example apparatus 300 in accordance with an implementation of the present disclosure. Apparatus 300 may perform various functions to implement schemes, techniques, processes and methods described herein pertaining to radar interference mitigation, including schemes 100 and 200 described above as well as processes 400, 500 and 600 described below. Apparatus 300 may be a part of an electronic apparatus, which may be an electronic control unit (ECU) of a vehicle. Alternatively, apparatus 300 may be a part of a portable or mobile apparatus, a wearable apparatus, a wireless communication apparatus or a computing apparatus. In some implementations, apparatus 300 may be in the form of one or more integrated-circuit (IC) chips such as, for example and without limitation, one or more single-core processors, one or more multi-core processors, or one or more complex-instruction-set-computing (CISC) processors. Apparatus 300 may include one or more of the components shown in FIG. 3. In some implementations, apparatus 300 may include a processor 310 and without the capability of a radar sensor. Alternatively, apparatus 300 may be implemented as a radar sensor and may include a wireless transmitter 320 and a wireless receiver 330, without processor 310. Apparatus 300 may also include one or more other components not pertinent to the proposed schemes of the present disclosure (e.g., internal power supply, display device and/or user interface device), and, thus, such other component(s) of apparatus 300 is/are neither shown in FIG. 3 nor described below in the interest of simplicity and brevity.

In one aspect, processor 310 may be implemented in the form of one or more single-core processors, one or more multi-core processors, or one or more CISC processors. That is, even though a singular term "a processor" is used herein to refer to processor 310, processor 310 may include multiple processors in some implementations and a single processor in other implementations in accordance with the present disclosure. In another aspect, processor 310 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 310 is a special-purpose machine specifically designed, arranged and configured to perform specific tasks including radar interference mitigation in accordance with various implementations of the present disclosure. Advantageously, processor 310 may allow the use or re-use of existing algorithms for FMCW, which have had decades of research and development. Moreover, processor 310 may allow the re-use of cost-effective FMCW architecture. Furthermore, processor 310 may alleviate interference concern and/or may increase the effective SNR when combining multiple chirps of measurements.

In some implementations, apparatus 300 may also include a radar sensor (e.g., wireless transmitter 320 and wireless receiver 330). For instance, wireless transmitter 320 and wireless receiver 330 may be part of a radar sensor. Wireless transmitter 320 may be configured to wirelessly transmit radio frequency (RF) signals as electromagnetic (EM) waves. Wireless receiver 330 may be configured to wirelessly receive RF signals as waves. For instance, as part of a radar sensor, wireless transmitter 320 may transmit signals and/or waveforms generated by processor 310, and wireless receiver 330 may receive one or more reflected waves reflected by an object (e.g., a vehicle, a cyclist, a pedestrian, an infrastructure object or any object potentially encountered by a moving vehicle). In some implementations, wireless receiver 330 may obtain waveform generation information (e.g., from processor 310) for receiver signal processing to perform correlation based on received waveforms (e.g., the one or more reflected waves) received by wireless receiver 330 and transmitted waveforms obtained from the waveform generation information (e.g., information pertaining to the signals/waveforms transmitted by wireless transmitter 320).

In some implementations, apparatus 300 may additionally include a memory 340. Memory 340 may be a storage device configured to store one or more sets of processor-executable codes, programs and/or instructions 342 as well as data 344 therein. Data 344 may include, for example, the waveform generation information. For example, memory 340 may be operatively coupled to processor 310 to receive data 344, and processor 310 may access memory 340 to execute the processor-executable instruction(s) 342. Memory 340 may be implemented by any suitable technology and may include volatile memory and/or non-volatile memory. For example, memory 340 may include a type of random access memory (RAM) such as dynamic RAM (DRAM), static RAM (SRAM), thyristor RAM (T-RAM) and/or zero-capacitor RAM (Z-RAM). Alternatively or additionally, memory 340 may include a type of read-only memory (ROM) such as mask ROM, programmable ROM (PROM), erasable programmable ROM (EPROM) and/or electrically erasable programmable ROM (EEPROM). Alternatively or additionally, memory 340 may include a type of non-volatile random-access memory (NVRAM) such as flash memory, solid-state memory, ferroelectric RAM (FeRAM), magnetoresistive RAM (MRAM) and/or phase-change memory.

In some implementations, processor 310 may include a control circuit 312, a modulation circuit 314 and a detection circuit 316. Control circuit 312 may control operations of wireless transmitter 320 and wireless receiver 330. Modulation circuit 314 may generate a plurality of wave frames for transmission by wireless transmitter 320. Each of the plurality of wave frames may respectively include a plurality of chirps. At least a first wave frame of the plurality of wave frames may be different from at least a second wave frames of the plurality of wave frames. At least a first chirp of the plurality of chirps of the first wave frame may be different from at least a second chirp of the plurality of chirps of the first wave frame. Detection circuit 316 may receive, from wireless receiver 330, one or more reflected waves comprising at least a portion of one or more of the wave frames reflected by an object. Detection circuit may also determine a distance between the object and apparatus 300, a speed of the objet, or both, based on an analysis of the one or more reflected waves.

In some implementations, in generating the plurality of wave frames, modulation circuit 314 may dynamically vary one or more aspects of the plurality of wave frames from one wave frame to another wave frame of the plurality of wave frames. In some implementations, the one or more aspects of the plurality of wave frames may include a FMCW ramp rate, a frequency range, an initial phase of a RF carrier, a duration of a gap between two adjacent chirps, a slope of an up ramp of a chirp, a slope of a down ramp of the chirp, or any combination thereof, of the respective chirps of each wave frame of the plurality of wave frames.

In some implementations, in generating the plurality of wave frames, modulation circuit 314 may generate the plurality of wave frames based on a pseudo random sequence. In some implementations, in generating the plurality of wave frames based on the pseudo random sequence, modulation circuit 314 may utilize a seed number for the pseudo random sequence, and wherein the seed number comprises a value of a real-time clock (RTC) at a time when wireless transmitter 320 is enabled to transmit the plurality of wave frames or when wireless receiver 330 is enabled to receive the one or more reflected waves.

In some implementations, in generating the plurality of wave frames, modulation circuit 314 may perform either or both of the following: (1) selecting a waveform of each chirp of each wave frame of the plurality of wave frames from a predetermined code book according to a predetermined sequence or a pseudo-random noise source; and (2) selecting waveforms of the chirps of each wave frame from the predetermined code book according to the predetermined sequence or the pseudo-random noise source such that the waveforms of the chirps vary from one wave frame to another wave frame of the plurality of wave frames.

In some implementations, in generating the plurality of wave frames, modulation circuit 314 may perform one or more of the following: (1) varying a slope of an up ramp, a slope of a down ramp, or both, of each chirp from one chirp to another chirp for the chirps of each wave frame of the plurality of wave frames; (2) varying a gap (e.g., top gap shown in FIG. 1) between the up ramp and the down ramp of each chirp from one chirp to another chirp for the chirps of each wave frame of the plurality of wave frames; (3) varying a gap (e.g., bottom gap shown in FIG. 1) between two adjacent chirps among the chirps of each wave frame of the plurality of wave frames; and (4) varying a gap (e.g., $T_{quiet}$) between two adjacent wave frames of the plurality of wave frames.

In some implementations, in generating the plurality of wave frames, modulation circuit 314 may vary a respective waveform of each of one or more chirps of each of one or more wave frames of the plurality of wave frames. In some implementations, in varying the respective waveform of each of the one or more chirps, modulation circuit 314 may vary the respective waveform of each of the one or more chirps in an open-loop manner, a closed-loop manner, or mixed.

In some implementations, processor 310 may be further capable of performing one or more of the following: (1) detecting one or more interference patterns in the one or more reflected waves; (2) adjusting, based on the detected one or more interference patterns, waveforms of at least one wave frame to be transmitted by wireless transmitter 320; (3) correlating or combining multiple detection results with respect to the object to enhance discrimination of the objection, an effective SNR, or both; (4) replacing an interfered chirp with an interpolation from adjacent chirps; and (5) replacing an interfered wave frame with an interpolation from adjacent wave frames.

Figure 4:
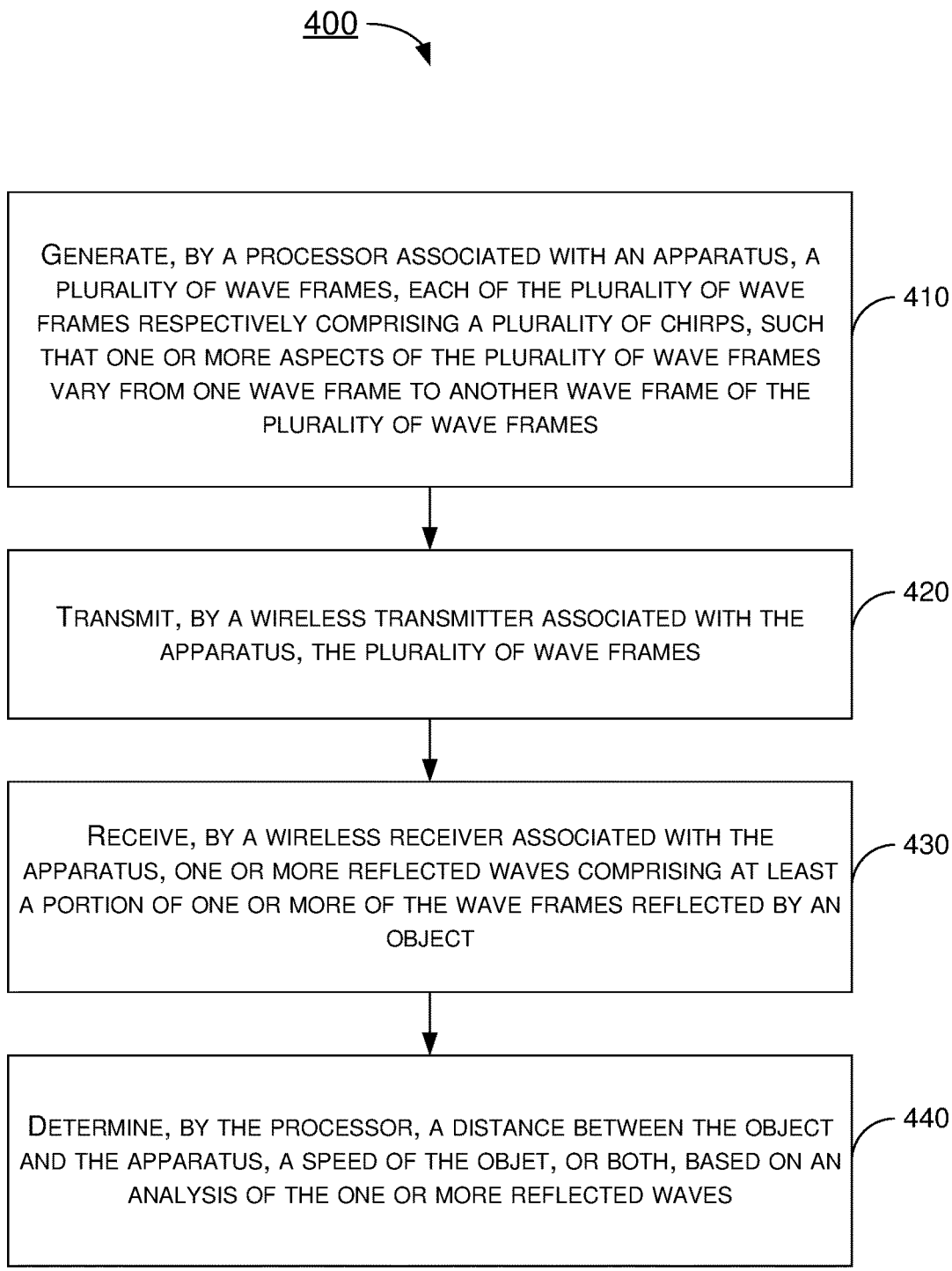
FIG. 4 is a flowchart of an example process in accordance with an implementation of the present disclosure.

FIG. 4 illustrates an example process 400 in accordance with an implementation of the present disclosure. Process 400 may be an example implementation of one, some or all of schemes 100 and 200, whether partially or completely, with respect to radar interference mitigation in accordance with the present disclosure. Process 400 may represent an aspect of implementation of features of apparatus 300. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by apparatus 300. Solely for illustrative purposes and without limitation, process 400 is described below in the context of apparatus 300. Process 400 may begin at block 410.

At 410, process 400 may involve processor 310 of apparatus 300 generating a plurality of wave frames, each of the plurality of wave frames respectively comprising a plurality of chirps, such that one or more aspects of the plurality of wave frames vary from one wave frame to another wave frame of the plurality of wave frames. Process 400 may proceed from 410 to 420.

At 420, process 400 may involve wireless transmitter 320 of apparatus 300 transmitting the plurality of wave frames. Process 400 may proceed from 420 to 430.

At 430, process 400 may involve wireless receiver 330 of apparatus 300 receiving one or more reflected waves comprising at least a portion of one or more of the wave frames reflected by an object. Process 400 may proceed from 430 to 440.

At 440, process 400 may involve processor 310 determining a distance between the object and apparatus 300, a speed of the objet, or both, based on an analysis of the one or more reflected waves.

In some implementations, the one or more aspects of the plurality of wave frames may include a FMCW ramp rate, a frequency range, an initial phase of a RF carrier, a duration of a gap between two adjacent chirps, a slope of an up ramp of a chirp, a slope of a down ramp of the chirp, or any combination thereof, of the respective chirps of each wave frame of the plurality of wave frames.

In some implementations, in generating the plurality of wave frames, process 400 may involve processor 310 generating the plurality of wave frames based on a pseudo random sequence. In some implementations, in generating the plurality of wave frames based on the pseudo random sequence, process 400 may involve processor 310 utilizing a seed number for the pseudo random sequence, and wherein the seed number comprises a value of a real-time clock at a time when wireless transmitter 320 is enabled to transmit the plurality of wave frames or when wireless receiver 330 is enabled to receive the one or more reflected waves.

In some implementations, in generating the plurality of wave frames, process 400 may involve processor 310 performing either or both of the following: (1) selecting a waveform of each chirp of each wave frame of the plurality of wave frames from a predetermined code book according to a predetermined sequence or a pseudo-random noise source; and (2) selecting waveforms of the chirps of each wave frame from the predetermined code book according to the predetermined sequence or the pseudo-random noise source such that the waveforms of the chirps vary from one wave frame to another wave frame of the plurality of wave frames.

In some implementations, in generating the plurality of wave frames, process 400 may involve processor 310 varying a respective waveform of each of one or more chirps of each of one or more wave frames of the plurality of wave frames. In some implementations, in varying the respective waveform of each of the one or more chirps, process 400 may involve processor 310 varying the respective waveform of each of the one or more chirps in an open-loop manner, a closed-loop manner, or mixed.

In some implementations, process 400 may further involve processor 310 performing one or more of the following: (1) detecting one or more interference patterns in the one or more reflected waves; (2) adjusting, based on the detected one or more interference patterns, waveforms of at least one wave frame to be transmitted by wireless transmitter 320; (3) correlating or combining multiple detection results with respect to the object to enhance discrimination of the objection, an effective SNR, or both; (4) replacing an interfered chirp with an interpolation from adjacent chirps; and (5) replacing an interfered wave frame with an interpolation from adjacent wave frames.

FIG. 5 illustrates an example process 500 in accordance with an implementation of the present disclosure. Process 500 may be an example implementation of one, some or all of schemes 100 and 200, whether partially or completely, with respect to radar interference mitigation in accordance with the present disclosure. Process 500 may represent an aspect of implementation of features of apparatus 300. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by apparatus 300. Solely for illustrative purposes and without limitation, process 500 is described below in the context of apparatus 300. Process 500 may begin at block 510.

At 510, process 500 may involve processor 310 generating a plurality of wave frames transmitted by wireless transmitter 320 associated with the apparatus. Each of the plurality of wave frames may respectively include a plurality of chirps. At least a first wave frame of the plurality of wave frames may be different from at least a second wave frames of the plurality of wave frames. At least a first chirp of the plurality of chirps of the first wave frame may be different from at least a second chirp of the plurality of chirps of the first wave frame. Process 500 may proceed from 510 to 520.

At 520, process 500 may involve processor 310 receiving, from wireless receiver 330, one or more reflected waves comprising at least a portion of one or more of the wave frames reflected by an object. Process 500 may proceed from 520 to 530.

At 530, process 500 may involve processor 310 determining a distance between the object and apparatus 300, a speed of the objet, or both, based on an analysis of the one or more reflected waves.

In some implementations, in generating the plurality of wave frames, process 500 may involve processor 310 dynamically varying one or more aspects of the plurality of wave frames from one wave frame to another wave frame of the plurality of wave frames. In some implementations, the one or more aspects of the plurality of wave frames may include a FMCW ramp rate, a frequency range, an initial phase of a RF carrier, a duration of a gap between two adjacent chirps, a slope of an up ramp of a chirp, a slope of a down ramp of the chirp, or any combination thereof, of the respective chirps of each wave frame of the plurality of wave frames.

In some implementations, in generating the plurality of wave frames, process 500 may involve processor 310 generating the plurality of wave frames based on a pseudo random sequence. In some implementations, in generating the plurality of wave frames based on the pseudo random sequence, process 500 may involve processor 310 utilizing a seed number for the pseudo random sequence, and wherein the seed number comprises a value of a real-time clock at a time when wireless transmitter 320 is enabled to transmit the plurality of wave frames or when wireless receiver 330 is enabled to receive the one or more reflected waves.

In some implementations, in generating the plurality of wave frames, process 500 may involve processor 310 varying a respective waveform of each of one or more chirps of each of one or more wave frames of the plurality of wave frames. In some implementations, in varying the respective waveform of each of the one or more chirps, process 500 may involve processor 310 varying the respective waveform of each of the one or more chirps in an open-loop manner, a closed-loop manner, or mixed.

In some implementations, process 500 may further involve processor 310 performing one or more of the following: (1) detecting one or more interference patterns in the one or more reflected waves; (2) adjusting, based on the detected one or more interference patterns, waveforms of at least one wave frame to be transmitted by wireless transmitter 320; (3) correlating or combining multiple detection results with respect to the object to enhance discrimination of the objection, an effective SNR, or both; (4) replacing an interfered chirp with an interpolation from adjacent chirps; and (5) replacing an interfered wave frame with an interpolation from adjacent wave frames.

FIG. 6 illustrates an example process 600 in accordance with an implementation of the present disclosure. Process 600 may be an example implementation of one, some or all of schemes 100 and 200, whether partially or completely, with respect to radar interference mitigation in accordance with the present disclosure. Process 600 may represent an aspect of implementation of features of a radar sensor (e.g., wireless transmitter 320 and wireless receiver 330 of apparatus 300). Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Process 600 may be implemented by apparatus 300 implemented as a radar sensor. Solely for illustrative purposes and without limitation, process 600 is described below in the context of apparatus 300. Process 600 may begin at block 610.

At 610, process 600 may involve wireless transmitter 320 transmitting a plurality of wave frames. Each of the plurality of wave frames may respectively include a plurality of chirps, with one or more aspects of the plurality of wave frames varying from one wave frame to another wave frame of the plurality of wave frames. Process 600 may proceed from 610 to 620.

At 620, process 600 may involve wireless receiver 330 receiving one or more reflected waves including at least a portion of one or more of the wave frames reflected by an object.

In some implementations, the one or more aspects of the plurality of wave frames may include a FMCW ramp rate, a frequency range, an initial phase of a RF carrier, a duration of a gap between two adjacent chirps, a duration of a gap between two adjacent wave frames, a slope of an up ramp of a chirp, a slope of a down ramp of the chirp, or any combination thereof, of the respective chirps of each wave frame of the plurality of wave frames.

In some implementations, the plurality of wave frames may include a plurality of wave frames generated based on a pseudo random sequence.

In some implementations, the plurality of wave frames generated based on the pseudo random sequence may include a plurality of wave frames generated by utilizing a seed number for the pseudo random sequence. Moreover, the seed number may include a value of a real-time clock (RTC) at a time when wireless transmitter 320 is enabled to transmit the plurality of wave frames or when wireless receiver 330 is enabled to receive the one or more reflected waves.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   transmitting, by a wireless transmitter associated with an apparatus, a plurality of wave frames, each of the plurality of wave frames respectively comprising a plurality of chirps, such that one or more aspects of the plurality of wave frames vary from one wave frame to another wave frame of the plurality of wave frames; and
   receiving, by a wireless receiver associated with the apparatus, one or more reflected waves comprising at least a portion of one or more of the wave frames reflected by an object,
   wherein the plurality of wave frames comprise a plurality of wave frames generated based on a pseudo random sequence,
   wherein the plurality of wave frames generated based on the pseudo random sequence comprise a plurality of wave frames generated by utilizing a seed number for the pseudo random sequence, and
   wherein the seed number corresponds to a value of a real-time clock (RTC) at a time when the wireless transmitter is enabled to transmit the plurality of wave frames or when the wireless receiver is enabled to receive the one or more reflected waves.

2. A method, comprising:
   generating, by a processor associated with an apparatus, a plurality of wave frames transmitted by a wireless transmitter associated with the apparatus;
   receiving, by the processor, one or more reflected waves comprising at least a portion of one or more of the wave frames reflected by an object; and
   determining, by the processor, a distance between the object and the apparatus, a speed of the object, or both, based on an analysis of the one or more reflected waves,
   wherein each of the plurality of wave frames respectively comprises a plurality of chirps,
   wherein at least a first wave frame of the plurality of wave frames is different from at least a second wave frames of the plurality of wave frames, and
   wherein at least a first chirp of the plurality of chirps of the first wave frame is different from at least a second chirp of the plurality of chirps of the first wave frame,
   wherein the generating of the plurality of wave frames comprises performing at least one of:
      selecting a waveform of each chirp of each wave frame of the plurality of wave frames from a predetermined code book according to a predetermined sequence or a pseudo-random noise source;
      selecting waveforms of the chirps of each wave frame from the predetermined code book according to the predetermined sequence or the pseudo-random noise source such that the waveforms of the chirps vary from one wave frame to another wave frame of the plurality of wave frames; and
      generating the plurality of wave frames based on a pseudo random sequence by utilizing a seed number for the pseudo random sequence,
   wherein the seed number correspond to a value of a real-time clock (RTC) at a time when a wireless transmitter is enabled to transmit the plurality of wave frames or when a wireless receiver is enabled to receive the one or more reflected waves.

3. An apparatus, comprising:
   a processor comprising:
      a control circuit that controls operations of a wireless transmitter and a wireless receiver;
      a modulation circuit that generates a plurality of wave frames for transmission by the wireless transmitter; and
      a detection circuit that receives, from the wireless receiver, one or more reflected waves comprising at least a portion of one or more of the wave frames reflected by an object, the detection circuit also determines a distance between the object and the apparatus, a speed of the object, or both, based on an analysis of the one or more reflected waves,
   wherein each of the plurality of wave frames respectively comprises a plurality of chirps,
   wherein at least a first wave frame of the plurality of wave frames is different from at least a second wave frames of the plurality of wave frames, and
   wherein at least a first chirp of the plurality of chirps of the first wave frame is different from at least a second chirp of the plurality of chirps of the first wave frame,
   wherein, in generating the plurality of wave frames, the modulation circuit performs at least one of:
      selecting a waveform of each chirp of each wave frame of the plurality of wave frames from a predetermined code book according to a predetermined sequence or a pseudo-random noise source;
      selecting waveforms of the chirps of each wave frame from the predetermined code book according to the predetermined sequence or the pseudo-random noise source such that the waveforms of the chirps vary from one wave frame to another wave frame of the plurality of wave frames; and generating the plurality of wave frames based on a pseudo random sequence by utilizing a seed number for the pseudo random sequence, wherein the seed number corresponds to a value of a real-time clock (RTC) at a time when the wireless transmitter is enabled to transmit the plurality of wave frames or when the wireless receiver is enabled to receive the one or more reflected waves.

4. An apparatus, comprising:

a radar sensor comprising:

a wireless transmitter; and a wireless receiver, wherein the wireless transmitter transmits a plurality of wave frames, wherein each of the plurality of wave frames respectively comprises a plurality of chirps, wherein one or more aspects of the plurality of wave frames vary from one wave frame to another wave frame of the plurality of wave frames, wherein the wireless receiver receives one or more reflected waves comprising at least a portion of one or more of the wave frames reflected by an object, wherein the plurality of wave frames comprise a plurality of wave frames generated based on a pseudo random sequence, wherein the plurality of wave frames generated based on the pseudo random sequence comprise a plurality of wave frames generated by utilizing a seed number for the pseudo random sequence, and wherein the seed number corresponds to a value of a real-time clock (RTC) at a time when the wireless transmitter is enabled to transmit the plurality of wave frames or when the wireless receiver is enabled to receive the one or more reflected waves.

\* \* \* \* \*